Oct. 29, 1968          K. C. JONES          3,407,828
CONTROL APPARATUS
Filed April 14, 1964
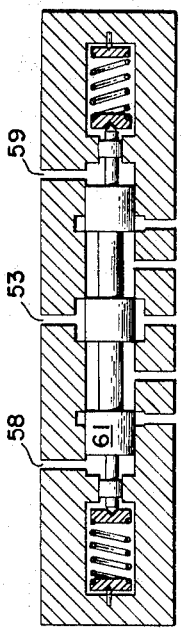
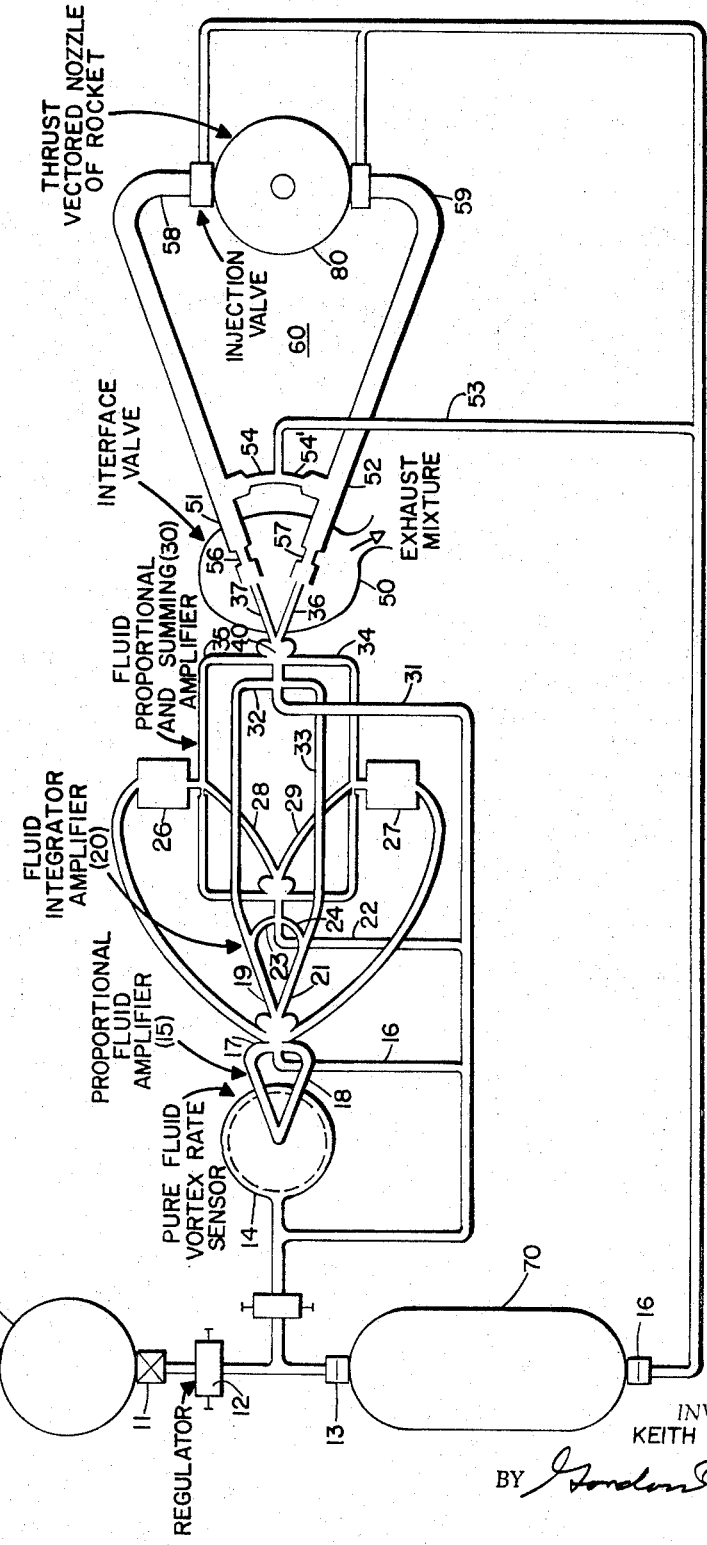
INVENTOR.
KEITH C. JONES
BY *Gordon Reed*
ATTORNEY

United States Patent Office 3,407,828
Patented Oct. 29, 1968

3,407,828
CONTROL APPARATUS
Keith C. Jones, Roseville, Minn., assignor to
Honeywell Inc., a corporation of Delaware
Filed Apr. 14, 1964, Ser. No. 359,576
11 Claims. (Cl. 137—81.5)

This invention relates to fluid operated systems which have substantially no moving parts and which perform functions provided heretofore by electronic or complex electro-mechanical devices. The invention thus with respect to the substantial absence of moving parts is similar broadly to prior fluid servosystems as in the patent to B. M. Horton, No. 3,111,291, and to its related patent to B. M. Horton, Serial No. 51,896, now Patent 3,122,165.

The invention herein has been embodied for example in a fluid operated system to provide a thrust vector control for a jet engine powering an aircraft.

An object of this invention is to provide an improved thrust vector control for a jet engine.

A further object of this invention is to provide an improved fluid operated control system wherein two mediums are used to control the direction of a jet engine thrust vector.

The foregoing objects of the invention, and other objects thereof will become apparent as the following description proceeds taken in conjunction with the accompanying drawing.

In said drawing, FIGURE 1 illustrates a thrust vector control system responsive to a fluid operated system; and
FIGURE 2 is a section of the injection valve of FIGURE 1.

According to this invention, a fluid responsive attitude hold control system which operates through thrust vector control of a jet engine will consist of (1) a stored cold gas (air) power supply to power aircraft condition sensors, as aircraft angular rate sensors; fluid (gas) amplifiers; a signal integrator; and an interface valve, and (2) a stored liquid injection power supply to provide high specific impulse secondary injection to a jet engine to provide thrust vectoring. The error signal in gaseous form from the angular rate sensor will be amplified, integrated and fed into a gas-liquid interface valve which in turn will actuate the injector valves for transmitting to the jet engine the stored liquid.

Returning to the drawing, FIGURE 1 is a fluid flow schematic diagram of the thrust vector control system configuration.

The subject arrangement is utilized to control the attitude of an aircraft about one of its body axes, for example, and with reference generally to FIGURE 1, a stored cold gas power supply 10 supplies power to a fluid vortex type rate sensor 14 which in turn controls fluid amplifiers 15, 20 and 30. The output of the craft flight condition sensor 14 is supplied to fluid amplifier 15, 20 and 30 in cascade with the amplifier 30 through an interface valve 50 controlling a liquid transmitting valve arrangement 60 to position a slidable valve to port fluid (Freon) from the liquid injectant tank 70 for thrust vector control purpose of the main nozzle 30 of a jet engine. The cold gas supplied in tank 10 will be stored under high pressure and will operate the system, including pressurizing the liquid injectant tank 70 upon receipt of an electric squib signal. Burst discs 13, 16 containing the liquid injectant will burst upon pressurization. The cold gas (air) supplied through initiator valve 11 will be pressure regulated through regulator 12 for constant and predictable fluid sensor and amplifier scale factor and gains. The all-fluid control system which requires a minimum of movable parts will provide pitch or yaw attitude control during powered flight. The arrangement will be principally housed in the boattail section adjacent a rocket nozzle whose thrust is to be vectored.

In the following, it is to be understood that the tank 10 may supply air as well as other gases to the fluid vortex rate sensor 14. The vortex rate sensor 14 is capable of sensing the angular velocity (rate) about an axis of a body such as an aircraft upon which the vortex rate sensor is mounted. The sensor develops a rate signal useful for control purposes herein. The vortex rate sensor is not new herein and generally comprises a device which provides a fluid flow field which is analogous to a classical two-dimensional pure sink flow in the absence of an input rate. The fluid in such a pure sink flow has only radial velocity. When the vortex rate sensor is subjected to an angular velocity about the input axis, as by angular rate of the aircraft about an axis, a tangential rotational velocity is imparted to the fluid. A tangential or rotational flow is described by a pure vortex flow. The pure vortex flow of the fluid is superimposed upon the pure sink flow and results in a combined vortex-sink flow in which the fluid streamlined pattern is a logarithmic spiral. A differential pressure in two ports of this vortex rate sensor is used in control ports or lines to control the relative flow from a pair of output channels of a proportional fluid amplifier 15.

A proportional fluid amplifier as herein utilized may be of the type disclosed in the Horton Patent 3,122,165 above. In such proportional fluid amplifier, a main source of fluid such as air is supplied to a main flow line 16, and control pressures are supplied to conduits 17, 18 which apply pressure at right angles to the direction of flow from conduit 16 in amplifier 15. Without any differential pressure in lines 17, 18 the flow through the fluid amplifier output channels 19, 21 is the same. However, the relative magnitude of the flow of air through channels 19, 21 may be varied in proportion to the difference in pressures in conduits 17, 18.

The flow in channels 19, 21 from amplifier 15 is supplied to the integrator amplifier 20 which also is of the fluid type. Integrating amplifier 20 receives its main supply through conduit 22 and has applied at right angles to the flow from conduit 22 the control pressures in channels 19, 21.

An integrating effect on the output of amplifier 20 as appearing in conduits 28, 29 is obtained through means including fluid capacitances 26 and 27 in feedback paths to amplifier 15. Integrating fluid amplifiers are old, see a prior application of Harvey D. Ogren and Walter M. Posingies, Serial No. 320,307 of October 31, 1963, and now abandoned.

Amplifier 30 is a proportional, fluid, summing amplifier and receives its main supply of air or gas from conduit 31. It has a proportional control signal supplied thereto through conduits 32, 33 and has an integral effect applied thereto from differential pressures supplied from conduits 34, 35 so that the output channels 36, 37 of amplifier 30 have a differential flow therein in accordance with the magnitude of the angular rate error and the integral of the magnitude of the error or simply stated proportional to the error and proportional to the integral of the error sensed by sensor 14.

The outputs in channels 36, 37 are supplied to an air-liquid interface valve 50. The function of the interface valve 50 is to coordinate the operation of air conducting conduits with liquid conducting conduits. The air conducting conduits or gas conducting conduits from amplifier 30 are the conduits 36, 37 and the liquid conducting conduits are the conduits 51, 52 of a servo valve positioning arrangement 60.

To assist in the understanding of the following, reference is made to Patent 3,095,906 to Kolm issued July 2, 1963. In said patent, a main fluid feed channel 44 supplies through restrictions 45, 45a fluid conducting channels 43, 42 respectively. Fluid feed channels 42, 43 communicate at one end with the chambers or interiors of the nozzles 39 and 40 respectively. Coacting with the nozzles is a variably positionable pressure regulator member 38 intermediate the nozzles. Subchannels 49 and 50 communicate with conduits 42 and 43 and have pressures therein applied to opposite ends of a servo control valve 23.

Similarly in the subject arrangement a main liquid supply conduit 53 feeds branch channels 54, 54', having restrictions therein. These branches 54, 54' supply conduits 51 and 52 which in turn supply nozzles 56, 57 through which liquid is discharged into the interface valve 50. Also similarly, as in Kolm, branch 54 is connected through conduits 51, 58 to one end of a servo valve FIGURE 2 and branch channel 54' connects through conduits 52, 59 to the opposite end of the servo valve plug 61 which may be similar to that shown in Kolm.

In the subject interface valve 50, the converging nozzles 56, 57 which discharge a liquid into the interface valve 50 are so positioned with respect to the discharge channels 36, 37 of fluid amplifier 30 that a dynamic head in channels 36, 37 is converted to a pressure head in conduits 51, 52. In other words an equivalent "flapper nozzle" control but using no moving parts is obtained; by "flapper nozzle" control is meant the effect provided by the movable regulator member 38 of Kolm with respect to the discharge nozzles 39, 40. In other words in the subject arrangement, a differential fluid pressure in conduits 51, 52 for positioning a servo valve plug is obtained without any moving parts from the output of the fluid amplifier 30.

A point designated by reference numeral 40 in amplifier 30 may be considered the control deflection jet mouth and the use of a set of converging nozzles 56, 57 placed within a few equivalent diameters of the controlled deflection jet mouth can efficiently convert and amplify the dynamic head to a pressure head. By pressurizing the converging nozzles 56, 57 through upstream restrictions as 45, 45a of Kolm in branch lines 54, 54', an equivalent "flapper nozzle" control leg without moving parts can be established.

This type of interface valve 50 can fulfill its function with similar effluents or for a gas to liquid interface without the gas and liquid mixing (except the exhaust) in the interface valve.

By establishing a pressure balance at the deflection jets in output channels 36, 37 from amplifier 30 at highest energy level, the system can convert to a hydrostatic system and eliminate the need for inefficient high volume pressure recovery. This type of system can also permit more control shaping by always keeping the control legs at a positive pressure.

The servo valve spool FIGURE 2 of the injection valve (similar to spool 23 of Kolm) which is displaced in either direction from a normal position in accordance with the differential pressure in fluid supply lines 51, 52 coacts with ports which supply a liquid such as Freon to a fluid operated device.

In the present application of the invention I utilize the displacement of the valve plug to vector the thrust of a main jet engine or rocket engine. While such valve plug may control the operation of a fluid operated servo motor (see for example servo motor 34 in Patent 3,069,852 for positioning jetavator 28 of a thrust vectoring apparatus) preferably I utilize the positioning of the valve spool or plug by differential pressure in lines 51, 52 to transmit Freon to the jet exhaust to effect the flow in a jet nozzle directly. Thus in the present instance I utilize secondary injection as a means of thrust vector control. Such secondary injection may be obtained similarly as in the patent to Wetherbee, No. 2,934,821, wherein valve means 36, 37 FIGURE 1 control the supply of air which is injected through slots 30. In the present instance I utilize the Freon instead of the air as in Wetherbee for secondary injection to control the direction of the main nozzle thrust.

Similarly, the arranvement in FIGURE 5 of the patent may be utilized wherein nitrogen or other gas under pressure may be connected to a valve 80 for selectively directing the gas under pressure to one or more of the slots 76 for thrust vector control purposes.

It will now be apparent that I have provided a novel condition control apparatus using few moving parts, to thereby increase reliability in performance, such apparatus may be used to control the flight condition of an aircraft such as angular motion about an axis to maintain a desired attitude thereof by changing attitude through thrust vector direction control.

While one representative embodiment and details of the invention have been shown for the purpose of illustrating it, it will be apparent to those skilled in the art that various changes and modifications may be made therein without departing from the spirit or scope of the invention.

What is claimed is:

1. In an automatic condition control apparatus for a dirigible craft, a differential air flow means responsive to turning of the craft, operable valve means for controlling turning of the craft, a liquid transmission means transmitting a liquid for operating the valve means, and further means providing an interface between air and liquid controlling the liquid transmission means from the differential air flow means.

2. Control means for controlling fluid pressure in a fluid pressure actuator system by interfacing a liquid and a gas, said system having a pair of liquid medium first medium pressure supply conduits comprising: control means for selectively supplying liquid first medium pressure fluid to the respective conduits; a slidable fluid flow control valve; pressure liquid fluid passageways connected to respective ends of said valve extending from said pair of liquid supply conduits; a restricted orifice in each supply conduit; and means including a fluid amplifier for transmitting a gaseous medium to said supply conduits for controlling the relative pressures in said passageways and conduits to effect actuation of said valve.

3. In fluid operated control apparatus: a valve movable in opposite directions by pressure in a liquid; a valve operating liquid conduit system connected with the ends of said valve; a fluid amplifier having two gaseous discharge channels connected to said liquid conduit system to apply differential pressure through said liquid to the ends of said valve for operation thereof; and means for relatively varying the gaseous discharge in said fluid amplifier channels to vary the differential liquid pressure.

4. In a first and a second fluid medium such as a gas and a liquid operated control apparatus, a slidable valve movable in opposite directions; a first supply conduit connected to one end of the valve; a second supply conduit connected to the other end of the valve, each conduit having a discharge nozzle remote from the valve; a chamber connectable with a source of the first medium pressurized fluid; a first subconduit having a flow restriction therein and extending from said chamber for the first medium to the first supply conduit intermediate the discharge nozzle and end of the valve; a second subconduit having a flow restriction therein extending from said chamber for the first medium to the second supply conduit intermediate the discharge nozzle therein and end of the valve; and a nozzle for supplying the second medium pressure to one of said discharge nozzles thereby to interface a gas and a liquid to increase the pressure of the first medium in one of said supply conduits to cause operation of said valve.

5. In a fluid operated control apparatus having a slidable valve movable in opposite directions, in combination: a first liquid supply conduit connected to one end of the valve; a second liquid supply conduit connected to the other end of the valve, each conduit having a discharge nozzle remote from the valve; a chamber connectable with a source of pressurized liquid; a first subconduit having a liquid flow restriction therein extending from said chamber to the first supply conduit intermediate the discharge nozzle and end of the valve; a second subconduit having a flow restriction therein extending from said chamber to the second supply conduit intermediate the discharge nozzle thereof and end of the valve, whereby equal liquid pressures are applied to the opposite ends of said valves with said liquid also passing through both discharge nozzles; and means for supplying greater gas pressure to one of said nozzles than to the other thus opposing the liquid flow through said discharge nozzle in said one conduit causing the increase in pressure therein to displace said valve.

6. In a fluid operated control apparatus having a slidable valve movable in opposite directions: a first liquid supply conduit connected to operate one end of the valve; a second liquid supply conduit connected to operate the other end of the valve, each conduit having a discharge nozzle therefor remote from the valve; a supply chamber connectable with a source of pressurized liquid; a first subconduit having a liquid flow restriction therein extending from said chamber to the first supply conduit intermediate the discharge nozzle and end of the valve; a second subconduit having a liquid flow restriction therein extending from said chamber to the second supply conduit intermediate the discharge nozzle and end of the valve; a further conduit connected to a supply of air pressure; and means for supplying air pressure from said conduit in a greater amount to one nozzle than to the other to decrease the flow in a discharge nozzle to increase the pressure in its related supply conduit, resulting in displacement of the valve.

7. The apparatus of claim 6 wherein the means for supplying greater air pressure to one nozzle than to the other comprises a proportional fluid amplifier having one channel adapted to supply pressure to one nozzle and a second channel supplying pressure to the other nozzle with means for varying the relative amount of air passing from said further conduit to said two fluid amplifier channels.

8. In a thrust vector control system for controlling attitude of a craft including a fluid operated plug type control valve, means including two first medium conduit lines for conducting liquid under pressure for reversibly actuating said valve, said lines having their opposite ends open a control unit for regulating the liquid flow through said lines to said valve comprising a chamber connected to a source of liquid pressure, a first subconduit including a restriction extending from the chamber to the conduit line for one end of said valve, a second subconduit extending from said chamber to the conduit line connected to the other end of said valve and including a flow restriction device; and means including a proportional fluid amplifier having its fluid discharge channels connected to the open ends of the two lines extending to the opposite ends of said valve and applying thereto a second and different medium flow to effect positioning of said valve.

9. In a servo valve having ports adapted to be connected as to a first fluid-medium operated load, a first stage-second and different medium or pneumatic fluid amplifier, a second stage-first medium or liquid operated valve spool having first medium transmission lines connected to opposed ends thereof, said lines arranged to receive at their opposite ends the output of said pneumatic amplifier and to receive at intermediate points said first medium for controlling the flow of liquid fluid through said ports, and means for relatively varying the dynamic flow through one channel of said fluid amplifier relative to that of the other channel to provide a differential pressure of the first medium in said lines.

10. In apparatusc omprising a servo valve having ports adapted to be connected as to control passage of a liquid fluid medium to operate a load, a first control stage; a controls stage valve spool of said servo valve connected to the first control stage thereby arranged to be driven by the output thereof for controlling the flow of the liquid fluid through said valve ports; a gaseous fluid amplifier having a controlled deflection jet mouth with said first control stage comprising converging nozzles located within a few equivalent diameters of the controlled deflection jet mouth, said nozzles normally discharging said liquid medium, for converting the dynamic head of the gaseous fluid amplifier to a pressure head thus providing an interface between a gaseous and liquid, a liquid fluid medium.

11. In a two fluid, namely a gaseous and a liquid fluid, control system for controlling a craft about an axis during powered flight, a servo valve having ports passing a first of said fluid mediums to control craft attitude; a transmission means transmitting the first of said fluid mediums for operating the servo valve; means including proportional fluid amplifiers passing the second of said fluid mediums as a dynamic head to said transmission means thereby interfacing said second medium with the first medium to provide a pressure head variably controlling positions of a spool of said valve with respect to said valve ports; and means responsive to a variable flight condition controlling said proportional fluid amplifiers.

References Cited
UNITED STATES PATENTS

| | | | |
|---|---|---|---|
| 826,979 | 7/1906 | Wilkinson | 137—83 |
| 2,903,007 | 9/1959 | Ziebolz | 137—83 |
| 2,904,056 | 9/1959 | Callender | 137—83 |
| 3,062,455 | 11/1962 | Reip | 137—83 X |
| 3,095,906 | 7/1963 | Kolm | 137—625.62 |
| 3,122,165 | 2/1964 | Horton | 137—81.5 |
| 3,124,999 | 3/1964 | Woodward | 137—81.5 X |
| 3,128,602 | 4/1964 | Salemka | 60—35.54 |
| 3,155,825 | 11/1964 | Boothe | 235—201 |
| 3,203,237 | 8/1965 | Ogren | 137—81.5 X |
| 3,204,405 | 9/1965 | Warren et al. | 137—81.5 X |

SAMUEL SCOTT, *Primary Examiner.*